Figure 1:
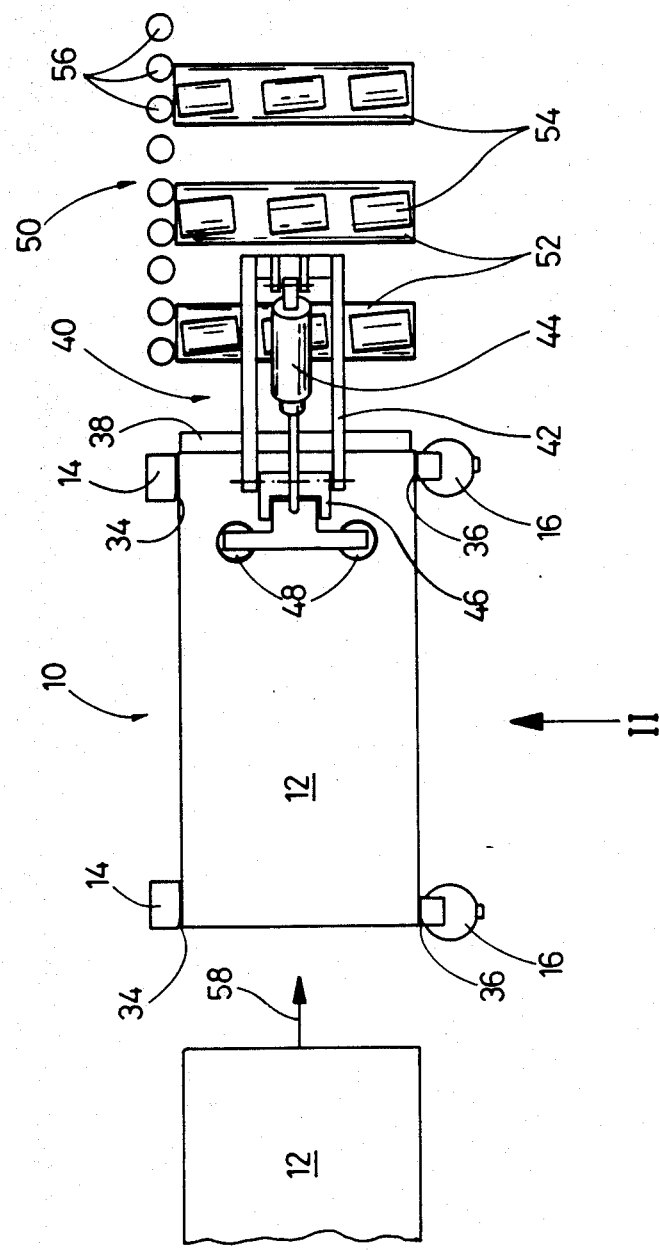

United States Patent [19]

Kramer

[11] Patent Number: 4,710,088
[45] Date of Patent: Dec. 1, 1987

[54] MAGAZINE FOR STACKING SHEET-METAL MEMBERS

[75] Inventor: Felix Kramer, Friedlisberg, Switzerland

[73] Assignee: Elpatronic AG, Switzerland

[21] Appl. No.: 924,066

[22] Filed: Oct. 28, 1986

[30] Foreign Application Priority Data

Nov. 1, 1985 [CH] Switzerland ............ 4709/85

[51] Int. Cl.4 ............................................. B65H 1/04
[52] U.S. Cl. .................................... 414/113; 206/449;
211/49.1; 271/169; 271/220; 410/38; 414/28;
414/35
[58] Field of Search ............ 414/28, 35, 36, 92,
414/93, 94, 96, 97, 113, 125, 126, 127; 271/134,
145, 161, 169, 166, 171, 220, 222, 223, 224;
221/242, 251; 211/49.1, 50, 59.2; 312/42, 50,
60; 410/38, 39, 40; 206/449, 453, 523, 555, 586,
591; 294/93, 119.1, 902

[56] References Cited

U.S. PATENT DOCUMENTS

| 1,326,334 | 12/1919 | Gaffney | 271/171 X |
|---|---|---|---|
| 1,957,318 | 5/1934 | Bush | 271/166 X |
| 2,488,674 | 11/1949 | Malott | 414/96 X |
| 2,785,893 | 3/1957 | Ford et al. | 271/169 |
| 2,957,691 | 10/1960 | Williams | 414/35 X |
| 3,330,425 | 7/1967 | Reda | 414/35 |
| 3,443,706 | 5/1969 | Puhm | 414/126 X |
| 4,013,179 | 3/1977 | Fluck | 414/126 X |

Primary Examiner—Leslie J. Paperner
Attorney, Agent, or Firm—McCormick, Paulding & Huber

[57] ABSTRACT

One column (16) of each of two pairs of columns (14,16) on which mutually remote edges of the sheet-metal members 12 are guided, has a resiliently flexible strip to exert a resilient pressure on the associated edges of the sheet-metal members (12) stacked between this column (16) and a rigid column (14) situated opposite. The strip is divided into a plurality of pressure members (10) which are disposed one below the other and are individually resiliently supported. As a result, the sheet-metal members (12) are kept snugly against the opposite rigid columns (14) and so precisely positioned ready for de-stacking; at the same time, however, individual sheet-metal members (12) are prevented from being loaded with excessively great spring forces.

2 Claims, 5 Drawing Figures

MAGAZINE FOR STACKING SHEET-METAL MEMBERS

The invention relates to a magazine for stacking sheet-metal members, particularly for the production of cans, having columns against which mutually remote edges of the sheet-metal members are guided.

Such magazines are used, for example in accordance with the U.S. Pat. application Ser. No. 840,440 of Mar. 17, 1986 on welding machines for welding tongues onto sheet-metal members which are subsequently processed to form cylindrical can bodies. In magazines of this type for these and other uses it is important that they should be able to be loaded with stacks of sheet-metal members in a simple manner and should keep these sheet-metal members in a precisely defined position in such a manner that they can be removed individually by means of a destacker working automatically and be deposited in an equally precisely predetermined position at one side of the magazine, for example on a conveyor which conveys them for further processing. On the other hand, a free space must be provided between the columns of a magazine of this type, which space is greater, by a tolerance range, than the space requirements of the stack of sheet-metal members which is to be introduced into the magazine. Certain tolerances result already during the cutting or punching to size of the individual sheet-metal members and in addition, a lateral offsetting of the sheet-metal members in relation to one another cannot always be completely avoided during the stacking.

It is the object of the invention to develop further a magazine of the type described at the beginning in such a manner that, despite the said inaccuracies, it is able to keep each individual sheet-metal member stacked therein in as precisely a predetermined position as possible ready for destacking.

According to the invention, the problem is solved in that at least one column comprises a resiliently yielding strip to exert a resilient pressure on the associated edges of the sheet-metal members stacked between this column and an opposite rigid column.

In the case of sheet-metal members which are not too thin in relation to their surface measurements and accordingly have an adequate stiffness, it may be sufficient if the resiliently flexible strip exerts a lateral force on the stack of sheets which is substantially independent of its height. If the individual sheet-metal members are comparatively thin, however, and can accordingly be bent easily, which applies to the majority of can sheets, a substantially constant force exerted by the strip on the stack of sheets might be too great when the greater part of the stack has been used and the last sheet-metal member remaining in the magazine is ultimately loaded with the whole force of the pressure strip.

In order to avoid this, the invention is preferably further developed in that the resiliently flexible strip is divided into a plurality of pressure members which are disposed one below the other and are individually resiliently supported.

In this case, it is an advantage if the pressure members are received in a common vertical groove in the associated column.

In order that the sheet-metal members may not be able to be caught in joints between the individual pressure members, it is further an advantage if the pressure members have surfaces deviating from a horizontal plane at their adjoining ends.

One example of an embodiment of the invention is described below, with further details, with reference to diagrammatic drawings.

Figure 2:
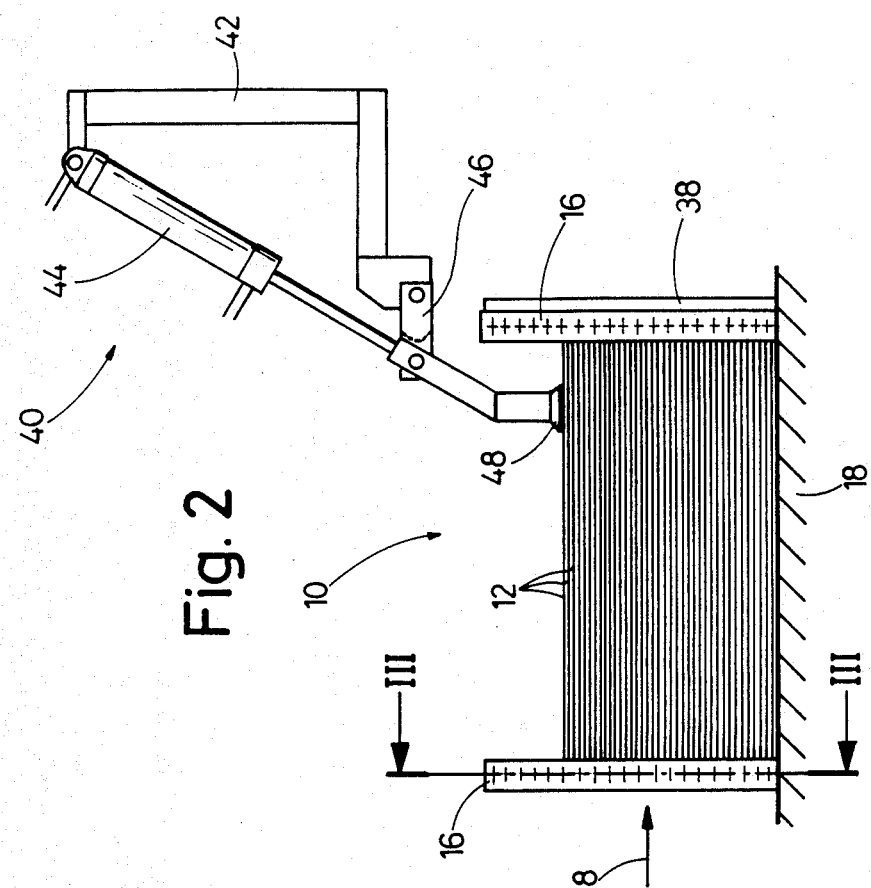
Figure 3:
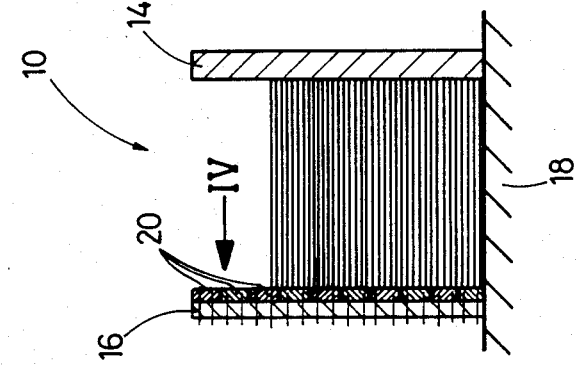
Figure 5:
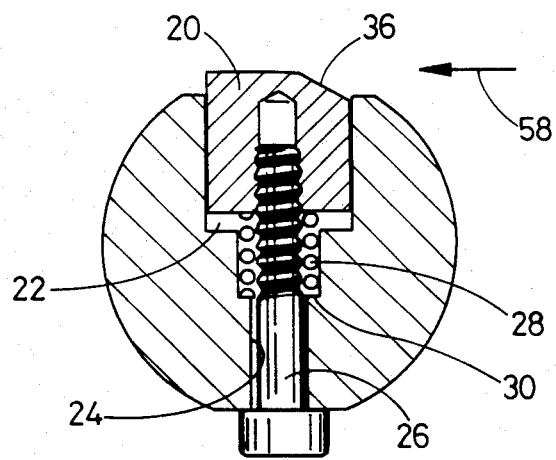
Figure 4:
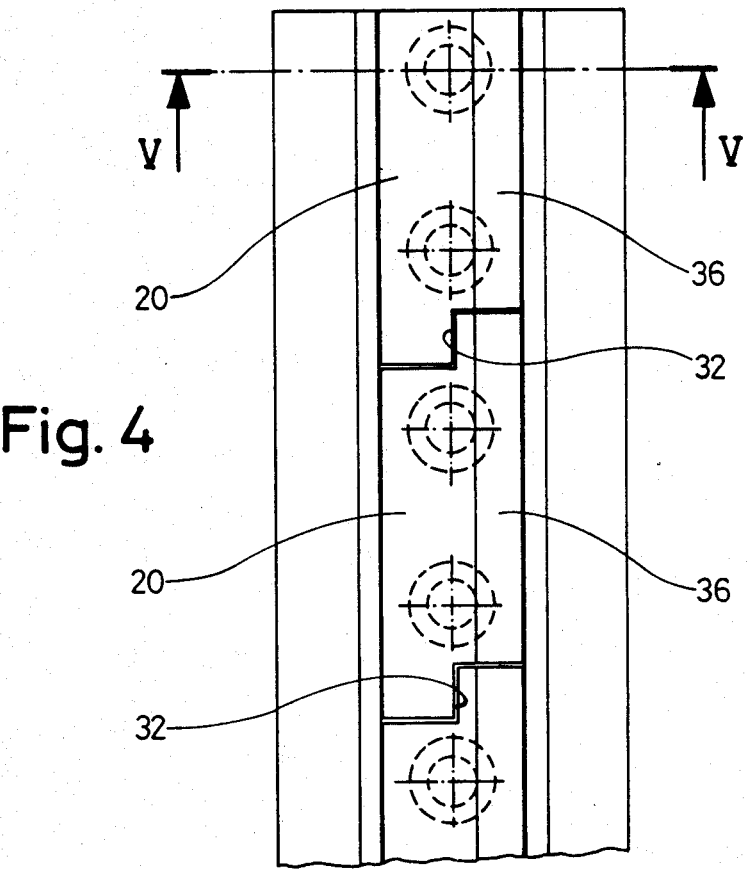

FIG. 1 shows the plan view of a magazine according to the invention with associated devices for conveying further, FIG. 2 shows the side view in the direction of the arrow II in FIG. 1, FIG. 3 shows the vertical cross-section III—III in FIG. 2, FIG. 4 shows a partial view in the direction of the arrow IV in FIG. 3 and FIG. 5 shows the partial section V—V in FIG. 4.

In FIGS. 1 to 3, a magazine 10 is illustrated which contains a stack of rectangular sheet-metal members 12, for example of tin plate 0.2 mm thick. The magazine 10 includes two one-piece columns 14 of substantially rectangular cross-section and two multi-part columns 16 of substantially circular cross-section. All the columns 14 and 16 extend vertically upwards from a common base plate 18; the two multi-part columns 16 are adjustable according to the width of the sheet-metal members 12.

Each of the two multi-part columns 16 comprises a plurality of pressure members 20, ten in the example illustrated, of substantially rectangular cross-section, which are disposed one above the other, without any gaps, in a vertical groove 22 and are displaceable horizontally in this groove, towards and away from the one-piece column 14 situated opposite. Two radial bores 24 disposed vertically one above the other lead into the vertical groove 22 behind each of the pressure members 20; guided in each of these bores is a screw 26 which is screwed to the associated pressure member 20 and limits its movement towards the opposite column 14.

Each of the screws 26 is surrounded by a helical compression spring 28 which is installed, with preloading, between the associated pressure member 20 and a shoulder 30 of the associated bore 24. Thus each pair of associated compression springs 28 tends to urge the associated pressure member 20 as far as possible out of the vertical groove 22 in the multi-part column 16 in question towards the opposite one-piece column 14.

The pressure members 20 are stepped at their ends situated one above the other in such a manner that there they each comprise a vertical face 32 which lies in the common plane of the axes of the screws 26, as can be seen from FIG. 4. This stepped formation reliably prevents the sheet-metal members 12 from penetrating into joints between the pressure members 20 and becoming caught there. The pressure members 20 are not, however, prevented by this stepped formation from resilient movements independent of one another in the axial direction of the associated screws 26.

The magazine 10 is open at its left-hand side in FIGS. 1 and 2. In order to facilitate pushing in a stack of sheet-metal members 12 from the left, the one-piece columns 14 each have a chamfer 34; a chamfer 36 is formed on each of the pressure members 20 in a corresponding manner. At the right-hand side in FIGS. 1 and 2, the magazine 10 is closed by a stop 38 in the form of a vertical plate.

Associated with the magazine 10 is a destacker 40; this includes a frame 42 which is movable vertically up and down and horizontally backwards and forwards in the longitudinal direction of the sheet-metal members 12. Pivotally mounted on the frame 42 at the top is the cylinder of a pneumatic piston-cylinder unit 44 and further down a link 46 in the vertical central longitudinal plane of the magazine 10, parallel to the plane of the drawing of FIG. 2. Mounted on the link 46 is the piston rod of the piston-cylinder unit 44 to which a pair of suction devices 48 is secured. In FIGS. 1 and 2, the destacker 40 is illustrated in a position in which its two suction devices 48 are in the process of grasping the uppermost sheet-metal member 12 in the magazine 10.

The destacker 40 is followed by a roller conveyor 50; this includes lower rollers 52 and upper rollers 54 each of which can be driven in rotation about a horizontal axis, the axes of the upper rollers 54 extending obliquely to those of the lower rollers 52. The roller conveyor 50 is bounded towards one side by lateral rollers 56, the axes of which lie in a vertical plane parallel to the central longitudinal plane of the magazine 10.

In FIG. 1, an arrow 58 indicates that the magazine 10 is loaded with a stack of sheet-metal members 12 in that this stack is pushed from the left in between the pairs of columns 14 and 16 as far as the stop 38. During the introduction of the stack, the pressure members 20 on the two columns 16 are forced back somewhat as a result of which the initial loading of the compression springs 28 is correspondingly intensified. The sheet-metal members 12 are then urged towards the opposite, rigid columns 14 by the pressure members 20 held in a precisely predetermined position as a result. The screws 26 which limit the spring displacement of the uppermost pressure member 20 on each of the two columns 16 are preferably adjusted so that these two pressure members bear almost, or completely, without pressure against the upper sheet-metal members 12 of those stacked or even leave these a very small clearance and so do not hamper the removal of the sheet-metal members.

During the destacking, the sheet-metal members 12 are removed individually, during which the suction devices 48 execute an arcuate movement upwards each time the piston-cylinder unit 44 moves in and during this the front edge of the sheet-metal member 12 in question is moved somewhat away from the stop 38 and is finally lifted away above this. The separation of the individual sheet-metal members 12 is promoted by known means, for example by like magnetization of superimposed edges of the sheet-metal members 12 and/or by a stream of air directed against these edges.

Each sheet-metal member 12, which has been lifted away over the stop 38 by the destacker 40 is subsequently lowered in such a manner that it comes between the rollers 52 and 54 of the roller conveyor 50 and is grasped and conveyed further by these. Thanks to their precise positioning in the magazine 10, the sheet-metal members 12 reach the roller conveyor 50 in a precisely predetermined position in which they have only a very short spacing from the lateral rollers 56. During the further conveying, the inclined upper rollers 54 then have the effect that the sheet-metal members 12 bear against the lateral rollers 56 after a very short conveying distance and, as a result, are positioned for further processing, for example for the provision of longitudinal scorings which define a tear-off strip.

I claim:

1. A magazine used with the production of cans for stacking sheet-metal members, comprising:
    a plurality of columns on which mutually remote edges of the sheet-metal members are guided; and
    a resiliently flexible strip for at least one of said columns for exerting pressure on the associated edges of the sheet-metal members stacked between a first one of said columns and an opposite rigid column, said strip divided into a plurality of resiliently supported pressure members disposed one below the other, and having surfaces (32) deviating from a horizontal plane at their adjoining ends.

2. The magazine of claim 1 wherein said pressure member surfaces further comprise a chamfer edge.

* * * * *